United States Patent
Seike et al.

(10) Patent No.: US 11,377,528 B2
(45) Date of Patent: Jul. 5, 2022

(54) REINFORCING FIBER MAT, AND FIBER-REINFORCED RESIN FORMING MATERIAL AND METHOD OF PRODUCING SAME

(71) Applicant: Toray Industries, Inc., Tokyo (JP)

(72) Inventors: Satoshi Seike, Nagoya (JP); Masaru Tateyama, Nagoya (JP); Mitsuki Fuse, Nagoya (JP); Hiroshi Hirano, Nagoya (JP); Akihiko Matsui, Nagoya (JP); Kazuma Ura, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 19 days.

(21) Appl. No.: 16/962,263

(22) PCT Filed: Jan. 17, 2019

(86) PCT No.: PCT/JP2019/001219
§ 371 (c)(1),
(2) Date: Jul. 15, 2020

(87) PCT Pub. No.: WO2019/146484
PCT Pub. Date: Aug. 1, 2019

(65) Prior Publication Data
US 2020/0354532 A1    Nov. 12, 2020

(30) Foreign Application Priority Data
Jan. 26, 2018  (JP) .............................. JP2018-011437
Jan. 26, 2018  (JP) .............................. JP2018-011449

(51) Int. Cl.
*C08J 5/06*    (2006.01)
*D04H 1/40*   (2012.01)

(52) U.S. Cl.
CPC ................ *C08J 5/06* (2013.01); *D04H 1/40* (2013.01); *C08J 2363/00* (2013.01); *C08J 2377/00* (2013.01)

(58) Field of Classification Search
CPC ........ B32B 2260/046; B32B 2262/106; B32B 27/08; D06M 15/59; D06M 15/55; D06M 2101/40; B29C 70/18; B29C 70/12; B29C 70/465; B29C 70/48; C08J 5/06; C08J 5/04; C08J 5/042; C08J 5/24; C08J 2363/00;
(Continued)

(56) References Cited
U.S. PATENT DOCUMENTS
2012/0276383 A1   11/2012  Hirano et al.
2015/0044455 A1    2/2015  Konagai et al.
(Continued)

FOREIGN PATENT DOCUMENTS
JP   2000-141502 A   5/2000
JP   2003-080519 A   3/2003
(Continued)

*Primary Examiner* — Camie S Thompson
(74) *Attorney, Agent, or Firm* — DLA Piper LLP (US)

(57) ABSTRACT

A reinforcing fiber mat includes reinforcing fiber bundles having an average fiber length of 5 mm to 100 mm, wherein reinforcing fiber bundles consisting of 86 or more fibers per bundle are contained at a weight content of more than 99 wt % to 100 wt % and the reinforcing fiber bundles contain single yarns by 500 fibers/mm-width or more and 1,600 fibers/mm-width or less and have a drape level of 120 mm or more and 240 mm or less.

14 Claims, 4 Drawing Sheets

(58) Field of Classification Search
CPC ...... C08J 2377/00; B29B 15/22; B29B 15/12; D04H 1/4218; D04H 1/4242; D04H 1/60; D04H 1/40; B29K 2063/00; B29K 2101/12; B29K 2105/12; B29K 2307/04
USPC ........ 428/297.4, 298.7, 299.1, 299.4; 442/59
See application file for complete search history.

(56) References Cited

U.S. PATENT DOCUMENTS

| | | | |
|---|---|---|---|
| 2015/0064408 A1 | 3/2015 | Taniguchi et al. | |
| 2015/0203642 A1 | 7/2015 | Sonoda et al. | |
| 2015/0292145 A1* | 10/2015 | Sonoda | D06M 15/513 |
| | | | 442/60 |
| 2017/0008260 A1 | 1/2017 | Fujii et al. | |
| 2017/0145627 A1* | 5/2017 | Sakurai | D06M 15/564 |

FOREIGN PATENT DOCUMENTS

| | | |
|---|---|---|
| JP | 2003-127240 A | 5/2003 |
| JP | 2013-104156 A | 5/2013 |
| JP | 5512908 B1 | 6/2014 |
| JP | 2014-205354 A | 10/2014 |
| JP | 5985085 B2 | 9/2016 |
| WO | 2011/089929 A1 | 7/2011 |
| WO | 2013/115337 A1 | 8/2013 |
| WO | 2016/104154 A1 | 6/2016 |
| WO | 2017/221657 A1 | 12/2017 |
| WO | 2018/143067 A1 | 8/2018 |

* cited by examiner

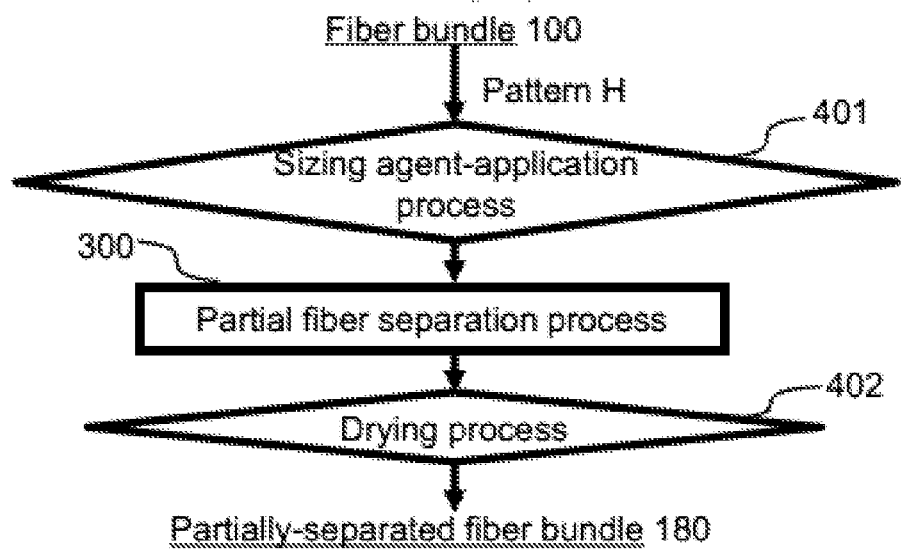
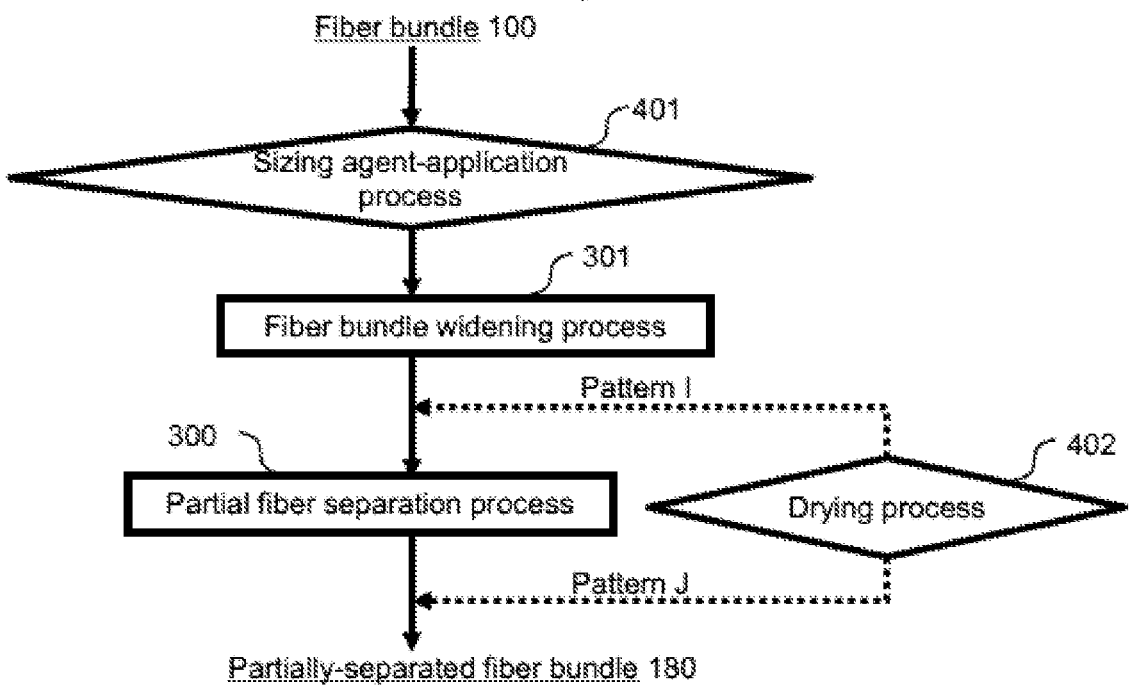

REINFORCING FIBER MAT, AND FIBER-REINFORCED RESIN FORMING MATERIAL AND METHOD OF PRODUCING SAME

TECHNICAL FIELD

This disclosure relates to a reinforcing fiber mat and a fiber-reinforced resin forming material excellent in mechanical properties, formability of complicated shapes and productivity.

BACKGROUND

Carbon fiber-reinforced plastics (CFRP), excellent in specific strength and specific rigidity, has actively been developed for automotive materials recently.

Such materials applied to automobiles include a prepreg and a material made of thermosetting resin used for airplanes and sports gear by resin transfer molding (RTM) or filament winding (FW). On the other hand, CFRP made from thermoplastic resin can be formed at high speed molding and excellent recycling efficiency so that they are expected to be a material suitable for mass production. Press forming can form a complicated shape of a large area with resin at a high productivity, and is expected to take the place of metal forming processes.

Press forming is performed mostly with a sheet-shaped material made of discontinuous reinforcing fiber as an intermediate base material. The sheet-shaped materials typically include sheet molding compound (SMC) and glass mat thermoplastic (GMT) as disclosed in JP 2000-141502 A and JP 2003-80519 A. Both of those intermediate base materials, which are used for so-called "Flow Stamping Forming" to charge the die cavity with material flowing inside, comprise relatively long reinforcing fibers dispersed like chopped strand and/or swirl in the thermoplastic resin. Such materials comprising fiber bundles consisting of many single yarns may have poor mechanical properties of shaped product in spite of excellent fluidity during a forming process. From viewpoints of production cost saving and productivity improvement, continuous production of intermediate base materials is required.

JP 5985085 B discloses a forming material having a multi-layer structure consisting of sheets different in fiber length and density parameter capable of achieving both good mechanical properties and fluidity. WO 2016/104154 discloses a fiber bundle including separated fiber sections and unseparated fiber sections applicable to a forming material excellent in mechanical properties and fluidity. JP 5512908 B discloses a forming material of which mechanical properties are enhanced by adjusting thickness, width or the like of fiber bundles. Although the balance between mechanical properties and fluidity have been improved, there is a further demand to improve. There is an expectation to enhance quality and improve continuous productivity of fiber-reinforced thermoplastic resin forming materials.

Accordingly, it could be helpful to provide a fiber-reinforced resin forming material excellent in productivity, capable of giving high mechanical properties to shaped products made of the fiber-reinforced resin forming material, as well as a reinforcing fiber mat excellent in fluidity at the time of forming process.

SUMMARY

We thus provide:

(1) A reinforcing fiber mat comprising reinforcing fiber bundles having an average fiber length of 5 mm to 100 mm, wherein reinforcing fiber bundles consisting of 86 or more fibers per bundle are contained by a weight content of more than 99 wt % to 100 wt %.

(2) The reinforcing fiber mat, wherein the reinforcing fiber bundles contain single yarns by 500 fibers/mm-width or more and 1,600 fibers/mm-width or less and have a drape level of 120 mm or more and 240 mm or less.

(3) The reinforcing fiber mat, wherein the reinforcing fiber bundles are coated with an epoxy resin.

(4) The reinforcing fiber mat according to any one of the preceding items, wherein the reinforcing fiber bundles are coated with a polyamide resin.

(5) The reinforcing fiber mat according to any one of the preceding items, wherein the reinforcing fiber bundles have a bundle hardness of 39 g or more and 200 g or less.

(6) The reinforcing fiber mat according to any one of the preceding items, wherein the reinforcing fiber bundles have an average thickness of 0.01 mm or more and 0.2 mm or less.

(7) The reinforcing fiber mat according to any one of the preceding items, wherein the reinforcing fiber bundles have an average width of 0.03 mm or more and 3 mm or less.

(8) The reinforcing fiber mat according to any one of the preceding items, wherein the reinforcing fiber bundles have a width change rate $W_2/W_1$ of 0.5 or more and 1.1 or less.

(9) The reinforcing fiber mat according to any one of the preceding items, wherein the reinforcing fiber bundles have a sizing agent adhesion amount of 0.1 wt % or more and 5 wt % or less.

(10) The reinforcing fiber mat according to any one of the preceding items, wherein the reinforcing fiber bundles have an average fiber number of 50 or more and 4,000 or less.

(11) The reinforcing fiber mat according to any one of the preceding items, wherein the reinforcing fiber bundles have a cutting angle $\theta$ of 3° or more and 30° or less.

(12) A fiber-reinforced resin forming material, comprising a thermoplastic resin and the reinforcing fiber mat according to any one of the preceding items.

(13) A fiber-reinforced resin forming material, comprising a thermoplastic resin and reinforcing fiber bundles and having a void ratio of 5 vol % or more and 30 vol % or less, wherein the reinforcing fiber bundle contain single yarns by 500 fibers/mm-width or more and 1,600 fibers/mm-width or less and have a drape level of 120 mm or more and 240 mm or less.

(14) A method of producing a fiber-reinforced thermoplastic resin forming material, comprising steps (A) to (D):

(A) Step of preparing a mat base material of reinforcing fiber bundles which contain single yarns by 500 fibers/mm-width or more and 1,600 fibers/mm-width or less and which have a drape level of 120 mm or more and 240 mm or less;

(B) Step of dispersing or layering thermoplastic resin on the mat base material;

(C) Step of melting the thermoplastic resin; and (D) Step of cooling and solidifying the melted thermoplastic resin between plates through a gap thicker by 5% or more than a thickness of a fully resin-impregnated base material.

We make it possible to provide a reinforcing fiber mat and a fiber-reinforced resin forming material excellent in mechanical properties, fluidity at the time of forming process and productivity.

BRIEF DESCRIPTION OF THE DRAWINGS

FIG. 6 is a process chart showing another example of timing of sizing agent-addition process with sizing agent-application process and drying process in a production method of partially-separated fiber bundle.

FIG. 7 is a process chart showing an example of timing of sizing agent-addition process with sizing agent-application process and drying process in a production method including a fiber bundle widening process of partially-separated fiber bundle.

EXPLANATION OF SYMBOLS

Figure 1:
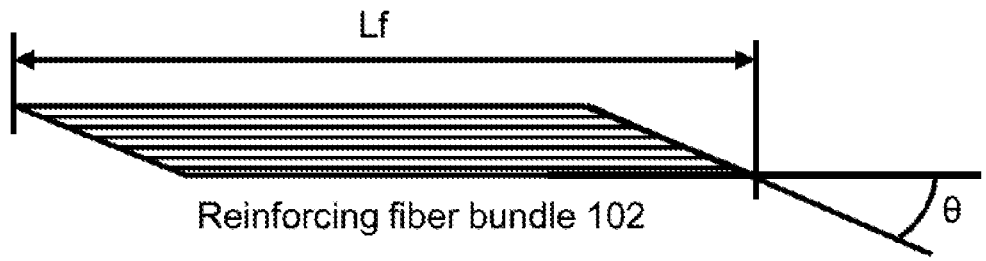
FIG. 1 is a plan view showing a reinforcing fiber bundle constituting an example of our reinforcing fiber mat.

100: fiber bundle
102: reinforcing fiber bundle
180: partially-separated fiber bundle
300: partial fiber separation process
301: fiber bundle widening process
400: sizing agent-addition process
401: sizing agent-application process
402: drying process
A-K: pattern

DETAILED DESCRIPTION

It is preferable that the reinforcing fiber is made of carbon fiber, glass fiber, aramid fiber or metal fiber, although it is not limited thereto. Above all, it is preferably made of carbon fiber. From viewpoints of improvement of mechanical properties and lightweight of fiber-reinforced resin, it is preferable that the carbon fiber is based on polyacrylonitrile (PAN), pitch or rayon, although it is not limited in particular. It is possible that one or more kinds of the carbon fiber are used together. Above all, it is further preferable to use the PAN-based carbon fiber from a viewpoint of balance between strength and elastic modulus of fiber-reinforced resin obtained.

It is preferable that the reinforcing fibers have a single fiber diameter of 0.5 μm or more. It is more preferably 2 μm or more, preferably 4 μm or more. Further, it is preferable that the reinforcing fibers have a single fiber diameter of 20 μm or less. It is more preferably 15 μm or less, preferably 10 μm or less. It is preferable that the reinforcing fibers have a strand strength of 3.0 GPa or more. It is more preferably 4.0 GPa or more, preferably 4.5 GPa or more. It is preferable that the reinforcing fibers have a strand elastic modulus of 200 GPa or more. It is preferably 220 GPa or more, preferably 240 GPa or more. The strength and elastic modulus of strand within the range can enhance the mechanical properties of shaped products made from the reinforcing fiber mat and resin.

It is preferable that the discontinuous reinforcing fiber bundle constituting the reinforcing mat has an average fiber number of 4,000 or less. It is more preferably 3,000 or less, preferably 2,000 or less. The average fiber number within the range can enhance mechanical properties of the reinforcing fiber mat. It is preferable that the average fiber number is 50 or more. It is more preferably 100 or more, preferably 200 or more. The average fiber number within the range can enhance fluidity of forming material made from the reinforcing fiber mat and resin. The average fiber number can be determined by the method to be described later.

The sizing agents to be added to reinforcing fiber constituting the reinforcing fiber mat include a compound having a functional group such as epoxy group, urethane group, amino group and carboxyl group. One or more kinds of them can be added together. When a water-soluble polyamide is used as a main component of a water-soluble bundling agent of reinforcing fibers, the water-soluble polyamide should be polyamide resin made by polycondensation between carboxylic acid and diamine of which the main chain has a tertiary amino group and/or oxyethylene group. The diamine may be a monomer which has a piperazine ring and of which the main chain has a tertiary amino group such as N,N'-bis (γ-amino propyl) piperazine and N-(β-aminoethyl) piperazine, or may be an alkyl diamine such as oxyethylene alkylamine of which main chain has an oxyethylene group. The dicarboxylic acid may be adipic acid, sebacic acid or the like.

The water-soluble polyamide may be a copolymer. The copolymer contains a component such as α-pyrrolidone, α-piperidone, ε-caprolactam, α-methyl-ε-caprolactam, ε-methyl-ε-caprolactam and ε-laurolactam. The copolymer may be a binary copolymer or a multicomponent copolymer capable of maintaining the physical property of water solubility with respect to copolymerization ratio. It is preferable that the copolymer contains a component having a lactam ring by 30 wt % or less so that the polymer is completely dissolved in water.

Even a less-soluble copolymer having a copolymerization ratio outside the preferable range can become water-soluble by acidizing the solution with an organic or an inorganic acid. The organic acid may be acetic acid, chloroacetic acid, propionic acid, maleic acid, oxalic acid, fluoroacetic acid or the like. The inorganic acid may be a general mineral acid such as hydrochloric acid, sulfuric acid and phosphoric acid.

It is possible that the water-soluble polyamide is used as a primary sizing agent of reinforcing fibers in which no sizing agent has been added. It is also possible that the water-soluble polyamide is used as a secondary sizing agent of reinforcing fibers in which the sizing agent has been added.

It is preferable that the sizing agent of 5 wt % or less is added to reinforcing fiber bundle of 100 wt % including the weight of the sizing agent added. It is more preferably 4 wt % or less, preferably 3 wt % or less. The sizing agent of more than 5 wt % might decrease the flexibility of fiber bundle so that excessively hardened fiber bundle cannot smoothly be wound in and wound off the bobbin. It might also cause single yarn breakage so that desirable chopped fiber bundle formation cannot be achieved. It is preferable that the sizing agent of 0.1 wt % or more is added thereto. It is more preferably 0.3 wt % or more, preferably 0.5 wt % or more. The sizing agent of less than 0.1 wt % might decrease adhesiveness between matrix and reinforcing fiber to deteriorate mechanical properties of shaped products. It might also make filaments dispersed as generating fluff so that fibers cannot easily be wound off the bobbin and that fibers wind around a nip roller or a cutter blade. The adhesion amount of sizing agent can be determined by a method to be described later.

The adhesion amount of sizing agent within the above-described range can improve productivity with improved properties such as smooth winding off the bobbin and reduced winding around the nip roller and the cutter blade. It can also suppress the breakage and single yarn dispersion of chopped fiber bundle so that holding ability of predetermined bundle formation is improved. Namely, a uniform and desirable formation of discontinuous reinforcing fiber bundle can be achieved by narrowing the distribution of the number of single yarns forming discontinuous reinforcing fiber bundle in the reinforcing fiber mat made from discontinuous reinforcing fiber bundles in which chopped fiber bundles are dispersed. Thus, the fiber bundles can be oriented in a plane to improve in mechanical properties. Further, variance of mechanical properties of shaped products can be reduced.

It is preferable that the sizing agent is uniformly adhered to the surface of reinforcing fiber. To make the sizing agent uniformly adhered as such, it is possible that fiber bundles are immersed with a roller in a sizing agent treatment liquid of polymer solution made by dissolving the sizing agent in water or alcohol and acidic solution of 0.1 wt % or more, preferably 1 to 20 wt %. It is also possible that fiber bundles are contacted to the sizing agent treatment liquid adhered to a roller and that mist of the sizing agent treatment liquid is sprayed to fiber bundles, although it is not limited thereto in particular. It is preferable to control parameters such as sizing agent treatment liquid concentration, temperature and yarn tension so that active components of the sizing agent are uniformly adhered to fiber bundles by an appropriate range of adhesion. It is more preferable that fiber bundles are vibrated by supersonic at the time of sizing agent-addition process. It is possible to add the sizing agent by the same method as the above-described sizing agent-adhesion process.

To remove solvent such as water and alcohol in the sizing agent adhered to reinforcing fibers, it is possible to employ heat treatment, air-drying or centrifugal separation. From a viewpoint of cost, it is preferable to employ the heat treatment. Heating means such as hot wind, hot plate, roller and infrared heater can be used for the heat treatment. The condition of heat treatment is important from viewpoints of handling ability and adhesiveness with matrix materials. Namely, temperature and time of heat treatment after adding sizing agent to fiber bundles should be adjusted according to components and adhesion amount of sizing agent. From a viewpoint of prevention of thermal deterioration, water-soluble polyamide as a sizing agent is dried at a temperature from room temperature to 180° C. to remove water and then is subject to heat treatment. It is preferable that the heat treatment temperature is 130° C. or more, preferably 200° C. or more. It is preferable that the heat treatment temperature is 350° C. or less, preferably 280° C. or less. The heat treatment temperature should be a temperature at which the water-soluble polyamide gets self-cross-linking by atmospheric oxygen or loses the water solubility. Because such a treatment makes the water-soluble polymer insoluble and less hydroscopic, the stickiness of strand of bundled filaments is suppressed to improve workability in a post processing while the adhesiveness with matrix materials is improved. Thus, easy-handling fiber bundles can be provided. It is also possible that a cross-linking promoter is added to the solvent so that the heat treatment temperature is lowered and the time is shortened. It is also possible that aging process is performed at an atmospheric temperature of 23±5° C. to enhance the hardness of fiber bundle.

The sizing agent of water-soluble polyamide resin excellent in affinity with matrix materials can improve composite properties remarkably. From a viewpoint of excellent improvement of adhesiveness, it is preferable to employ polyamide-based resin, polyimide-based resin, polyamide-imide-based resin or polyether-amide-imide-based resin.

The water-soluble polyamide as a secondary sizing agent may be added to reinforcing fiber which primary sizing agent has been added to by the same method as described above, or may be added thereto in a reinforcing fiber bundle production process. The sizing agent is added at any time in a reinforcing fiber bundle production process. For example, the sizing agent may be added by a general method in which sizing agent treatment liquid prepared by dissolving (or dispersing) the sizing agent in solvent (or dispersion media) is applied to fiber bundles and is dried and vaporized to remove the solvent. It is possible to perform a partial fiber separation process or a fiber bundle widening process between the application process and the drying process as described later.

It is preferable that the sizing agent starts the heat decomposition at a temperature of 200° C. or more. It is more preferably 250° C. or more, preferably 300° C. or more. The heat decomposition start temperature can be determined by a method to be described later.

Figure 3:
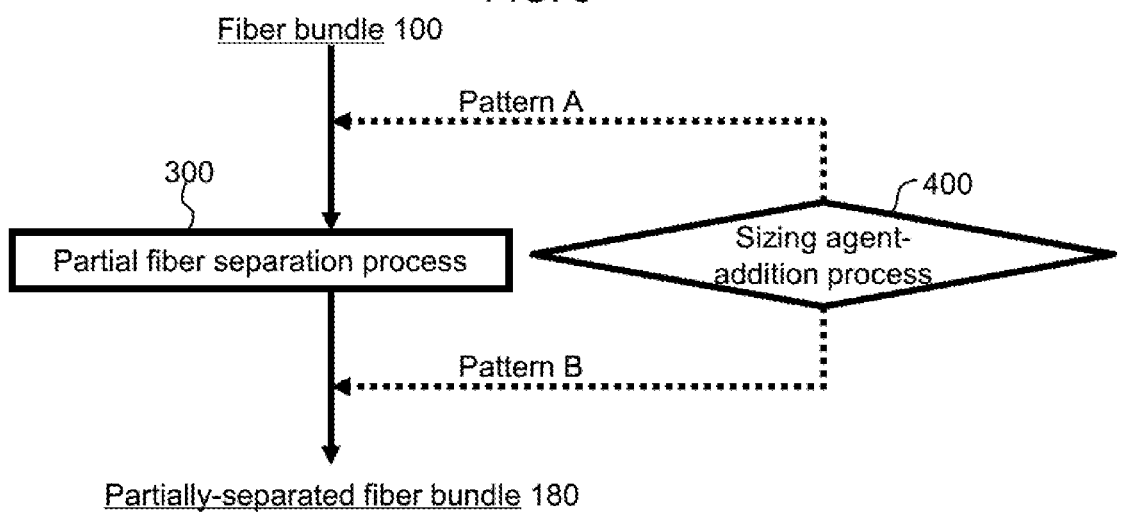
FIG. 3 is a process chart showing an example of timing of sizing agent-addition process in a production method of partially-separated fiber bundle.

Next, the timing of adding the sizing agent will be explained. FIG. 3 shows an example of timing of sizing agent-addition process in a production process of reinforcing fiber bundle constituting our reinforcing fiber mat. In FIG. 3, partially-separated fiber bundle 180 is formed from fiber bundle 100 through partial fiber separation process 300, wherein sizing agent-addition process 400 is performed before partial fiber separation process 300 in pattern A while sizing agent-addition process 400 is performed after partial fiber separation process 300 in pattern B. It is possible to employ the timing of pattern A or pattern B.

Figure 4:
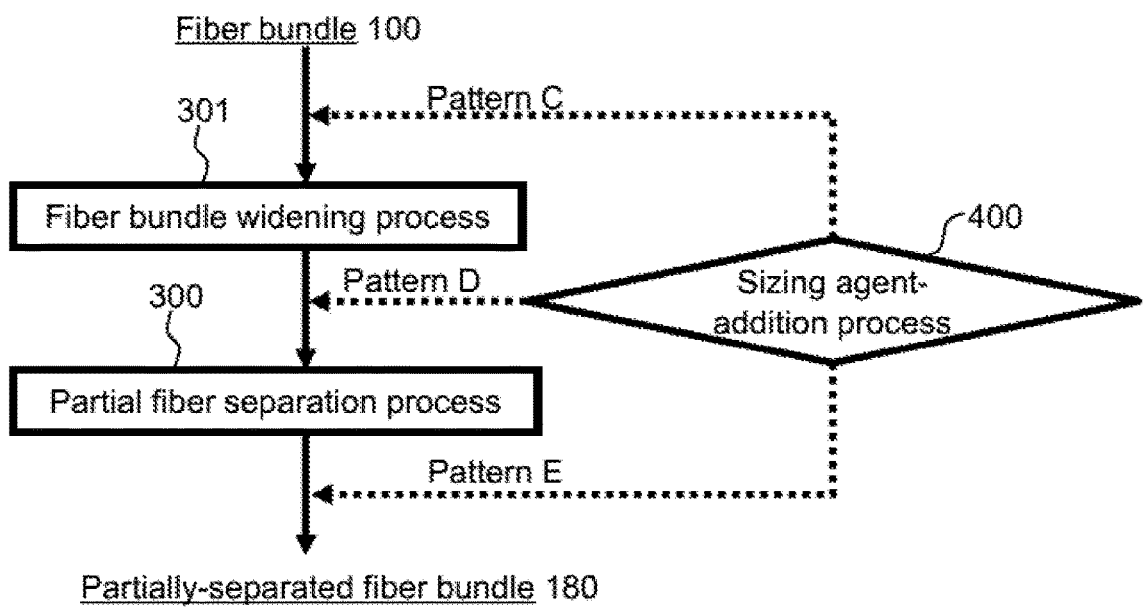
FIG. 4 is a process chart showing an example of timing of sizing agent-addition process in a production method including a fiber bundle widening process of partially-separated fiber bundle.

FIG. 4 shows an example of timing of sizing agent-addition process 400 in a production process of reinforcing fiber bundle including fiber bundle widening process 301. In FIG. 4, partially-separated fiber bundle 180 is formed from fiber bundle 100 through fiber bundle widening process 301 and partial fiber separation process 300 in this order, wherein sizing agent-addition process 400 is performed before fiber bundle widening process 301 in pattern C, sizing agent-addition process 400 is performed between fiber bundle widening process 301 and partial fiber separation process 300 in pattern D and sizing agent-addition process 400 is performed after partial fiber separation process 300 in pattern E. It is possible to employ the timing of pattern C, pattern D or pattern E. From a viewpoint of desirable partial fiber separation process, it is preferable to employ the timing of pattern D.

Figure 5:
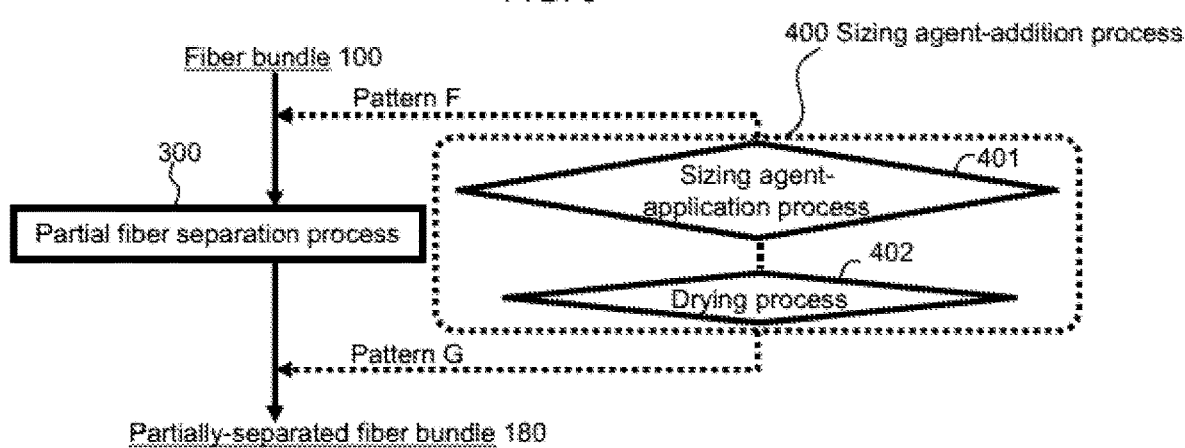
FIG. 5 is a process chart showing an example of timing of sizing agent-addition process with sizing agent-application process and drying process in a production method of partially-separated fiber bundle.

FIG. 5 shows an example of timing of sizing agent-addition process in a production process of reinforcing fiber bundle constituting our reinforcing fiber mat including the sizing agent-application process and the drying process. In FIG. 5, partially-separated fiber bundle 180 is formed from fiber bundle 100 through partial fiber separation process 300, wherein sizing agent-addition process 400 including sizing agent-application process 401 and drying process 402 is performed before partial fiber separation process 300 in pattern F while sizing agent-addition process 400 is performed after partial fiber separation process 300 in pattern G. It is possible to employ the timing of pattern F or pattern G. Pattern F is substantially the same as pattern A in FIG. 3 while pattern G is substantially the same as pattern B in FIG. 3.

FIG. 6 shows another example of timing of sizing agent-addition process in a production process of reinforcing fiber bundle constituting our reinforcing fiber mat including the sizing agent-application process and the drying process. In pattern H of FIG. 6, the sizing agent-application process 401 and drying process 402 are performed at separated timings in sizing agent-addition process 400. Sizing agent-application process 401 is performed before partial fiber separation process 300 while drying process 402 is performed after partial fiber separation process 300.

FIG. 7 shows an example of timing of the sizing agent-addition process including the sizing agent-application process and the drying process in a production process of reinforcing fiber bundle including the fiber bundle widening process in which partially-separated fiber bundle 180 is formed from fiber bundle 100 through fiber bundle widening process 301 and partial fiber separation process 300 in this order, wherein sizing agent-application process 401 of sizing agent-addition process is performed before fiber bundle widening process 301 while drying process 402 is performed between fiber bundle widening process 301 and partial fiber separation process 300 in pattern I and drying process 402 is performed after partial fiber separation process 300 in pattern J.

Figure 8:
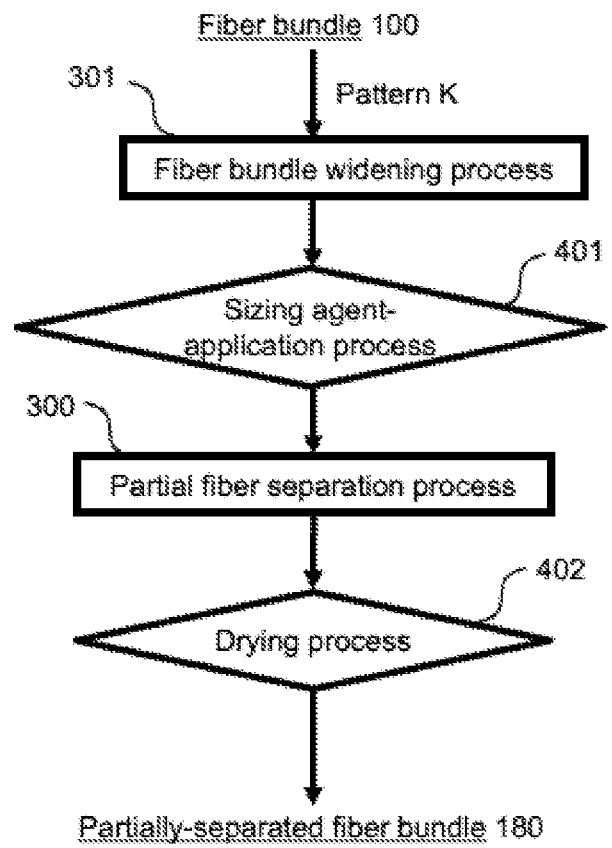
FIG. 8 is a process chart showing another example of timing of sizing agent-addition process with sizing agent-application process and drying process in a production method including a fiber bundle widening process of partially-separated fiber bundle.

FIG. 8 shows another example of timing of the sizing agent-addition process including the sizing agent-application process and the drying process in a production process of reinforcing fiber bundle including the fiber bundle widening process in which partially-separated fiber bundle 180 is formed from fiber bundle 100 through fiber bundle widening process 301 and partial fiber separation process 300 in this order, wherein sizing agent-application process 401 of sizing agent-addition process is performed between fiber bundle widening process 301 and partial fiber separation process 300 while drying process 402 is performed after partial fiber separation process 300 in pattern K.

Thus, the sizing agent can be added at various timings in our production method of reinforcing fiber bundle.

It is preferable that the reinforcing fiber bundle constituting our reinforcing fiber mat contains bundles having a fiber number of 86 or more in a bundle by weight content of 99 wt % to 100 wt %. The weight content of less than 99 wt % might have a poor fluidity of forming material.

It is preferable that the reinforcing fiber bundle constituting our reinforcing fiber mat has a drape level of 120 mm or more. It is more preferably 145 mm or more, preferably 170 mm or more. The drape level of less than 120 mm might make filaments dispersed as generating fluff so that fibers cannot easily be wound off the bobbin and that fibers wind around a nip roller or a cutter blade. It is preferably 240 mm or less. It is more preferably 230 mm or less, preferably 220 mm or less. The drape level of more than 240 mm might decrease the flexibility of fiber bundle so that excessively hardened fiber bundle cannot smoothly be wound in and wound off the bobbin. It might also cause single yarn breakage so that desirable chopped fiber bundle formation cannot be achieved. The drape level of reinforcing fiber bundle constituting the reinforcing fiber mat can be determined by a method to be described later.

It is preferable that the reinforcing fiber bundle constituting our reinforcing fiber mat has a bundle hardness of 39 g or more. It is more preferably 70 g or more, preferably 120 g or more. The hardness of less than 39 g might make filaments dispersed as generating fluff so that fibers cannot easily be wound off the bobbin and that fibers wind around a nip roller or a cutter blade. It is preferable that the reinforcing fiber bundle constituting our reinforcing fiber mat has a bundle hardness of 200 g or less. It is more preferably 190 g or less, preferably 180 g or less. The fiber bundle hardness of more than 200 g might cause a trouble that excessively hardened fiber bundle cannot smoothly be wound in and wound off the bobbin. It might also cause single yarn breakage so that desirable chopped fiber bundle formation cannot be achieved. The hardness of reinforcing fiber bundle constituting the reinforcing fiber mat can be determined by a method to be described later.

It is preferable that the discontinuous reinforcing fiber bundle constituting our reinforcing fiber mat contains single yarns per unit width of 500 fibers/mm or more. It is more preferably 600 fibers/mm or more, preferably 700 fibers/mm or more. The content of less than 500 fibers/mm might cause a poor fluidity of forming material. It is preferably 1,600 fibers/mm or less. It is more preferably 1,400 fibers/mm or less, preferably 1,200 fibers/mm or less. The content of more than 1,600 fibers/mm might cause poor mechanical properties of shaped product. The number of single yarns per unit width can be determined by a method to be described later.

Figure 2:
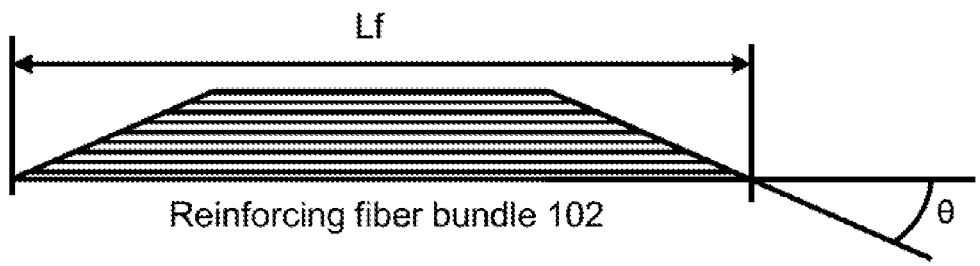
FIG. 2 is a plan view showing a reinforcing fiber bundle constituting another example of our reinforcing fiber mat.

It is preferable that the discontinuous reinforcing fiber bundle constituting our reinforcing fiber mat has a weight average fiber length of 5 mm or more. It is more preferably 7 mm or more, preferably 10 mm or more. It is preferable that the discontinuous reinforcing fiber bundle has a weight average fiber length of 100 mm or less. It is more preferably 50 mm or less, preferably 25 mm or less. The weight average fiber length of the reinforcing fiber bundle of less than 5 mm might deteriorate mechanical properties. On the other hand, the weight average fiber head of the reinforcing fiber bundle of more than 100 mm might deteriorate formability. The weight average fiber length is defined as an average value of fiber length Lf in FIG. 1 or 2 among 20 pieces of discontinuous reinforcing fiber bundles. It is preferable that the reinforcing fiber bundle 102 has a cross-section angle (cutting angle θ) of 3° or more with respect to the fiber direction as shown in FIGS. 1 and 2. It is more preferable that the cutting angle θ is 4° or more, preferably 5° or more. The fiber bundles can stably be cut by the angle within the range. Further, it is preferable that the angle is 30° or less. It is more preferably 25° or less, preferably 15° or less. The angle within the range can achieve both a good fluidity during the forming process and high mechanical properties of shaped product. Besides, θ should be expressed in absolute value.

It is preferable that the discontinuous reinforcing fiber bundle constituting our reinforcing fiber mat has a thickness of 0.01 mm or more. It is more preferably 0.03 mm or more, preferably 0.05 mm or more. The thickness of less than 0.01 mm might cause a poor fluidity of forming material. It is preferable that the discontinuous reinforcing fiber bundle constituting our reinforcing fiber mat has a thickness of 0.2 mm or less. It is more preferably 0.18 mm or less, preferably 0.16 mm or less. The thickness or more than 0.2 mm might cause poor mechanical properties of shaped product.

It is preferable that the discontinuous reinforcing fiber bundle constituting our reinforcing fiber mat has a number average bundle width of 0.03 mm or more. It is more preferably 0.05 mm or more, preferably 0.07 mm or more. The width of less than 0.03 mm might cause a poor fluidity of forming material. It is preferable that the discontinuous reinforcing fiber bundle constituting our reinforcing fiber mat has an average bundle width of 3 mm or less. It is more preferably 2 mm or less, preferably 1 mm or less. The width of more than 3 mm might cause poor mechanical properties of shaped product.

It is preferable that the reinforcing fiber bundle has width change rate W2/W1 of 0.5 or more, where W1 is a width of discontinuous reinforcing fiber bundle constituting our reinforcing fiber mat before being immersed in water and W2 is a width of the reinforcing fiber bundle after being immersed in water at 25° C. for 5 min and taken out to drain water for 1 min. It is more preferably 0.6 or more, preferably 0.7 or more. When the sizing agent-applied discontinuous reinforcing fiber bundle has width change rate W2/W1 of less than 0.5, residual water-soluble property of sizing agent which adheres to the discontinuous reinforcing fiber bundle might make the separated fiber bundles reaggregate after fiber separation process so that the fiber bundle is difficult to maintain the formation in which the number of single yarns is optimally adjusted. Unless the fiber bundle maintains the formation in which the number of single yarns is optimally adjusted, it is difficult to achieve a good balance between fluidity at the time of forming and mechanical properties of shaped product because the formation may not be optimized in an intermediate base material of discontinuous fiber bundle made by cutting/dispersing the separated fiber bundles for preparing a forming material to be used to form a composite material. It is preferable that width change rate W2/W1 is 1.1 or less. The width change rate W2/W1 of more than 1.1 might cause a trouble that excessively hardened fiber bundle cannot smoothly be wound in and wound off the bobbin. It might also cause single yarn breakage so that desirable chopped fiber bundle formation cannot be achieved. The width change rate W2/W1 can be determined by a method to be described later.

In our reinforcing fiber mat, discontinuous reinforcing fiber bundle is impregnated with matrix thermoplastic resin (M) such as polyamide resin, polyacetal, polyacrylate, polysulfone, ABS, polyester, acryl, polybutylene terephthalate (PBT), polyethylene terephthalate (PET), polyethylene, polypropylene, polyphenylene sulfide (PPS), polyetheretherketone (PEEK), liquid crystal polymer, polyvinyl chloride, fluorinated resin like polytetrafluoroethylene and silicone. It is preferable that the thermoplastic resin is a polyamide-based resin. It is more preferable that the polyamide is blended with inorganic antioxidant. The thermoplastic polyamide resin may be: nylon 6, nylon 11 or nylon 12 which is provided by polycondensation of ring-opening polymerization of cyclic lactams or ω-aminocarboxylic acid; nylon 66, nylon 610, nylon 612, nylon 6T, nylon 61, nylon 9T, nylon M5T or nylon MFD6 which is provided by polycondensation of diamine and dicarboxylic acid; or nylon 66.6.61 or nylon 66.6.12 which is provided by polycondensation of two or more kinds of diamine dicarboxylic acid. From viewpoints of mechanical properties and cost, it is preferable to employ nylon 6, 66 or 610.

It is possible to add a copper halide or derivative thereof such as copper iodide, copper bromide, copper chloride and complex salt of mercaptobenzimidazole and copper iodide. It is preferable to use copper iodide or complex salt of mercaptobenzimidazole and copper iodide. It is preferable that the copper halide or derivative thereof is added by 0.001 to 5 parts by weight to 100 parts by weight of thermoplastic polyamide resin. The additive amount of less than 0.001 might not sufficiently suppress resin decomposition, fume and odor at the time of preheating while the additive amount of more than 5 parts by weight might not improve the effect. It is preferably 0.002 to 1 parts by weight from a viewpoint of balance between heat stabilization effect and cost.

In our reinforcing fiber mat of discontinuous reinforcing fiber bundle, it is possible that the thermoplastic resin fiber contained in the reinforcing fiber mat is used as a matrix resin. It is also possible that the reinforcing fiber mat without thermoplastic resin fiber is impregnated with matrix resin at any step of production of reinforcing fiber mat.

It is also possible that the reinforcing fiber mat including thermoplastic resin fiber as a raw material is impregnated with matrix resin at any step of production of reinforcing fiber mat. The matrix resin may be or may not be the same as resin constituting thermoplastic resin fiber. Even when the matrix resin is different from the resin constituting thermoplastic resin fiber, it is preferable that they have a compatibility or a high affinity.

Our fiber-reinforced resin forming material chiefly consists of a reinforcing fiber bundle and thermoplastic resin, having voids of 5 vol % or more. It is preferable that the void ratio is 7 vol % or more, preferably 10 vol % or more. The void ratio of less than 5 vol % might move the base material of reinforcing fiber bundle to prevent a rapid production. The void ratio is 30 vol % or less. It is more preferably 25 vol % or less, preferably 20 vol % or less. The void ratio of more than 30 vol % might deteriorate impregnation of thermoplastic resin to deteriorate mechanical properties. The void ratio can be determined by a method to be described later.

The void of fiber-reinforced resin forming material, the drape level and the number of single yarns per unit width of reinforcing fiber bundle can be set within the above-described ranges to greatly improve mechanical characteristic, fluidity and productivity.

The reinforcing fiber mat may be impregnated with thermoplastic resin as a matrix resin by an impregnation pressing machine to produce the fiber-reinforced resin forming material. The pressing machine should achieve temperature and pressure required to perform matrix resin impregnation. It is possible to employ a general pressing machine having a planar platen going up and down or a so-called double belt press machine having a mechanism of running a pair of endless steel belts. In such an impregnation process, discontinuous fiber mat may be laminated with film or nonwoven or woven sheet made of matrix resin to perform matrix resin melting/impregnation by the above-described pressing machine. It is possible that particles of matrix resin are dispersed on the reinforcing fiber mat to prepare a laminate. It is also possible that particles of matrix resin are dispersed and blended inside the reinforcing mat together with the discontinuous reinforcing fiber bundles.

Our fiber-reinforced thermoplastic resin forming material may be produced by following steps (A) to (D):

(A) Step of preparing a mat base material of reinforcing fiber bundles which contain single yarns by 500 fibers/mm-width or more and 1,600 fibers/mm-width or less and which have a drape level of 120 mm or more and 240 mm or less.

(B) Step of dispersing or layering thermoplastic resin on the mat base material.

(C) Step of melting the thermoplastic resin.

(D) Step of cooling and solidifying the melted thermoplastic resin between plates through a gap thicker by 5% or more than a thickness of a fully resin-impregnated base material.

In Step (A), reinforcing fiber bundles having the above-described physical properties are chopped into a predetermined length to be dispersed over a sheet to prepare a mat base material made of discontinuous reinforcing fiber bundles.

In Step (B), thermoplastic resin particles as a matrix resin are dispersed on the mat base material obtained in Step (A), or alternatively, sheet-shaped thermoplastic resin such as film, nonwoven fabric or woven fabric is layered on the mat base material. In Step (A), it is possible that thermoplastic resin particles are dispersed together with the chopped fiber bundles having a predetermined fiber length dispersed over a sheet so that thermoplastic resin is blended inside the mat base material.

Steps (C) and (D) can be performed with a pressing machine to impregnate the mat base material with thermoplastic resin as a matrix resin. The pressing machine should achieve temperature and pressure required to perform matrix resin impregnation. It is possible to employ a general pressing machine having a planar platen going up and down or a so-called double belt press machine having a mechanism of running a pair of endless steel belts. It is preferable that the gap between plates is thicker by 5% or more than the thickness of base material fully impregnated with resin. Detail of the base material thickness of base material fully impregnated with resin will be explained later.

The fiber-reinforced thermoplastic resin forming material produced by the above-described series of steps uses reinforcing fiber bundles having predetermined physical properties to make a shaped product having the above-described range of void ratio so that shaped products can be made from the forming material with enhanced productivity to exhibit high mechanical properties as well as excellent fluidity at the time of forming process.

EXAMPLES

Hereinafter, our mats, materials and methods will be explained in detail with reference to Examples. Methods of measurement, calculation and evaluation are as follows.

(1) Measurement Method of Void Ratio of Fiber-Reinforced Resin Forming Material

The void ratio of fiber-reinforced resin forming material is determined as an average value among 10 samples calculated by Formula (4) according to JIS K-7075 (1991). Fiber mass content Wf [%] is calculated by Formula (1) from results of combustion method measured in a condition of 500° C., 15 min and nitrogen atmosphere. Specific gravity $\rho c$ of fiber-reinforced resin forming material is determined according to A method (underwater substitution method) of JIS K-7112 (1999).

$$Wf = M1/M0 \times 100 [\text{mass \%}] \quad (1)$$

(M1: reinforcing fiber mass [mg] after combustion, M0: fiber-reinforced resin forming material mass [mg] before combustion)

$$Vf = (Wf/\rho f)/(Wf/\rho f + (100 - Wf)/\rho r) \times 100 [\%] \quad (2)$$

(Vf: fiber volume content of fully resin-impregnated fiber-reinforced resin forming material, $\rho f$: specific gravity of reinforcing fiber, $\rho r$: specific gravity of thermoplastic resin)

$$Vr = 100 - Vf [\%] \quad (3)$$

(Vr: resin volume content of fully resin-impregnated fiber-reinforced resin forming material, $\rho r$: specific gravity of thermoplastic resin)

$$\text{Void ratio} = (1 - 100 \times \rho c/(\rho f \times Vf + \rho r \times Vr)) \times 100 [\%] \quad (4)$$

(2) Measurement Method of Base Material Thickness of Fully Resin-Impregnated Fiber-Reinforced Resin Forming Material The base material thickness of fully resin-impregnated fiber-reinforced resin forming material is determined as an average value among 10 samples calculated by Formula (5) with mass per unit area P [g/m²] of fiber-reinforced resin forming material, fiber volume content Vf of fully resin-impregnated fiber-reinforced resin forming material, resin volume content Vr of fully resin-impregnated fiber-reinforced resin forming material, specific gravity pf of reinforcing fiber and specific gravity $\rho r$ of thermoplastic resin. The mass per unit area P [g/m²] of fiber-reinforced resin forming material is measured with a forming material having a size of 100 mm square.

$$\text{Fully resin-impregnated fiber-reinforced resin forming material thickness} = P/(\rho f \times Vf + \rho r \times Vr) \quad (5)$$

The "fully resin-impregnated" means a condition of forming material regarded as being densely impregnated with resin.

(3) Measurement Method of Average Fiber Number

Weight per unit length a (mg/m) of filament constituting reinforcing fiber bundle is calculated from weight per unit length of reinforcing fiber bundle and filament number. Next, the number of fibers constituting the bundle is calculated by Formula (6) from measured values of fiber length c (mm) and weight b (mg) of reinforcing fiber bundle cut into lengths around 10 mm. The average fiber number is defined as an average number of fibers among 20 pieces of reinforcing fiber bundles.

$$\text{Fiber number of reinforcing fiber bundle} = (b \times 1{,}000/(a \times c)) \quad (6)$$

(4) Measurement Method of Adhesion Amount of Sizing Agent

A 5 g sample of reinforcing fiber bundle with sizing agent adhered is dried in a heat-resistant container at 80° C. for 24 hours under a vacuum condition. It is cooled down to room temperature as preventing from absorbing moisture and reinforcing fiber bundles having weight of m1 (g) are obtained. The container including the fiber bundles is subject to an ashing process in nitrogen atmosphere at 500° C. for 15 min. It is cooled down to room temperature as preventing from absorbing moisture and reinforcing fiber bundles having weight of m2 (g) are obtained. The adhesion amount of sizing agent adhered to reinforcing fiber bundle is calculated by Formula (7). The measurement is performed for 10 pieces of fiber bundles to calculate an average value.

$$\text{Adhesion amount}[\text{wt \%}] = 100 \times \{(m1 - m2)/m1\} \quad (7)$$

(5) Measurement Method of Heat Decomposition Start Temperature

The heat decomposition start temperature of sizing agent is determined as follows. A 5 mg sample of reinforcing fiber bundle with sizing agent applied is dried at 110° C. for 2 hours and then cooled down in a desiccator at room temperature for 1 hour. It is weighed and subject to TGA measurement in an air atmosphere. The weight decrease from room temperature to 650° C. is measured, in a condition of 50 ml/min of air flow rate and 10° C./min of temperature increase rate. In the TGA curve of which vertical axis is weight ratio [%] of sizing agent-applied yarn to the initial yarn and of which horizontal axis is temperature [° C.], two tangent lines are drawn at the first temperature of maximum weight decrease rate [%/° C.] and at the second temperature of local minimum weight decrease rate, the second temperature adjacent to the first temperature higher. The heat decomposition start temperature is defined as a temperature of the intersection point of the tangent lines.

The definition of the heat decomposition start temperature is applied to a state after the chemical denaturation of sizing agent and before the matrix resin impregnation. When the heat decomposition start temperature of sizing agent-applied reinforcing fiber bundle cannot be determined, the sizing agent may be used in place of the reinforcing fiber bundle.

(6) Measurement Method of Drape Level

Figure 9:
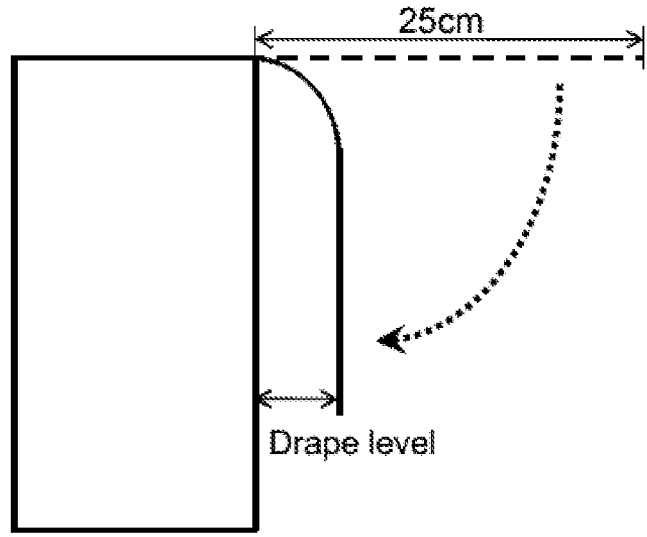
FIG. 9 is a schematic view showing a measurement method of drape level.

A reinforcing fiber bundle cut into 30 cm length is laid straight on a flat plate to make sure there is no curves and twists. When curves or twists are found, it is preferable that they are removed by heating under 100° C. or by pressurizing under 0.1 MPa. As shown in FIG. 9, the reinforcing fiber bundle cut into 30 cm length is fixed to an edge of cuboid stand in an atmosphere at 23±5° C., the reinforcing fiber bundle protruding by 25 cm from the edge of the stand to make a 5 cm part from one edge of the reinforcing fiber bundle positioned at the edge of the stand. After leaving it for 5 min, the shortest distance between the other edge of the reinforcing fiber bundle and the side end of the stand is measured. The drape level is defined as an average value among measurement samples of n=5.

(7) Measurement Method of Bundle Hardness

The hardness of the reinforcing fiber bundle is determined with HANDLE-O-Meter ("CAN-1MCB" made by DAIEI KAGAKU SEIKI MFG. Co., Ltd.) according to JIS L-1096 with E method (Handle-o-meter method). A test piece having 10 cm length and 1 mm width with 1,600 filaments is prepared by opening a reinforcing fiber bundle. The slit width is set to 20 mm. The reinforcing fiber bundle test piece placed on a test stand provided with the slit groove is pushed by a blade into the groove by a predetermined depth such as 8 mm depth while the resisting force (g) is measured. The hardness of reinforcing fiber bundle is defined as an average value of measured resisting force among 3 samples.

(8) Measurement Method of Average Bundle Thickness

The thickness is measured at 20 points at intervals of every 30 cm along the longitudinal direction (fiber direction) of fiber bundle to calculate an average fiber bundle thickness. The bundle thickness variance is defined as a coefficient of variance thereof.

(9) Measurement Method of Average Fiber Bundle Width

The bundle width is measured at 20 points at intervals of every 30 cm along the longitudinal direction (fiber direction) of fiber bundle to calculate an average fiber bundle width. The bundle width variance is defined as a coefficient of variance thereof.

(10) The Single Yarn Number Per Unit Width

The single yarn number per unit width is calculated by dividing average fiber number by average fiber bundle width.

(11) Measurement of Width Change Rate of Sizing Agent-Applied Reinforcing Fiber Bundle A carbon fiber bundle which has been prepared by widening to 50 mm width from 40 mm width before the reinforcing fiber bundle separation is applied with sizing agent and cut into 230 mm length. The first position of 30 mm from one edge of the bundle is nipped with a clip to measure widths at 5 points between the first position and the second position of 100 mm from the other edge. Width W1 before immersion is defined as an average value of the measured widths. Then, it is immersed in water at 25° C. for 5 min and is taken out to hang it so that the clipped side is up while draining water for 1 min. The width is measured at 5 points between the first position and the second position of 100 mm from the other edge. Width W2 after immersion is defined as an average value of the measured widths. The width change rate of sizing agent-applied reinforcing fiber bundle is calculated by Formula (8).

$$\text{Width change rate} = W2/W1 \tag{8}$$

(12) Process Passability

The process passability of reinforcing fiber bundle separation process and a process of continuously cutting and dispersing the separated reinforcing fiber bundle is evaluated into levels A to C.
A: Reinforcing fiber bundle can be separated. The separated reinforcing fiber bundles are wound off the bobbin to be cut or dispersed properly.
B: Reinforcing fiber bundle can be separated. However, the separated reinforcing fiber bundles wind around the bobbin or the cutter section for 1 to 7 times per 1,000 m.
C: Reinforcing fiber bundle cannot be separated. Or the separated reinforcing fiber bundles wind around the bobbin or the cutter section for 8 or more times per 1,000 m even though the fiber can be separated.

(13) Evaluation Method of Mechanical Properties

A flat plate shaped product having size of 500×400 is prepared by forming a reinforcing fiber mat by the method to be described later. The flat plate is cut into size of 100×25×2 mm of total 32 test pieces of which 16 pieces are cut along the flat plate longitudinal direction (0°) and of which 16 pieces are cut along the orthogonal direction (90°). The test pieces are subject to a measurement according to JIS K7074 (1988). Mechanical properties are determined with respect to parameters of bending strength, bending elastic modulus, CV levels (%) of bending strength and bending elastic modulus (CV: Coefficient of Variance). The bending strength of less than 200 MPa is evaluated as level C, while 200 MPa or more and less than 350 MPa is evaluated as level B and 350 MPa or more is evaluated as A. The CV level (%) of bending strength of more than 15% is evaluated as C, while 10% or more and 15% or less is evaluated as B and less than 10% is estimated as A.

(14) Fluidity Test (Stamping Forming)

Resin Sheet (1)

Two forming materials having size of 150 mm×150 mm×2 mm are stacked to be preheated to 260° C. of base material center temperature (temperature at the center of the stack). Then, the stack is pressurized at 10 MPa for 30 sec on a pressing plate heated to 150° C. The fluidity is defined as a value of A2/A1×100(%) where A2 (mm$^2$) is an area after pressurization and A1 (mm$^2$) is an area before pressing. The fluidity of less than 200% is evaluated as level C while the fluidity of 200% or more and less than 300% is evaluated as level B and the fluidity of 300% or more is evaluated as level A.

Resin Sheet (2)

Two forming materials having size of 150 mm×150 mm×2 mm are stacked to be preheated to 220° C. of base material center temperature (temperature at the center of the stack). Then, the stack is pressurized at 10 MPa for 30 sec on a pressing plate heated to 120° C. The fluidity is defined as a value of A2/A1×100(%) where A2 (mm$^2$) is an area after pressurization and A1 (mm$^2$) is an area before pressing. The fluidity of less than 200% is evaluated as level C while the fluidity of 200% or more and less than 300% is evaluated as level B and the fluidity of 300% or more is evaluated as level A.

Raw Materials

Reinforcing fiber bundle (1): Carbon fiber bundle ("PX35" made by ZOLTEK company, single yarn number of 50,000, "13" sizing agent) is used.
Reinforcing fiber bundle (2): Glass fiber bundle (240TEX made by Nitto Boseki Co., Ltd., single yarn number of 1,600) is used.
Resin sheet (1): Polyamide master batch made of polyamide 6 resin (made by Toray Industries, Inc., "Amilan" (registered trademark) CM1001) is used to prepare the sheet.
Resin sheet (2): Polypropylene master batch made of native polypropylene resin (made by Prime Polymer Co., Ltd., "Prime Polypro" (registered trademark) J106MG) of 90 mass % and acid-modified polypropylene resin (made by Mitsui Chemicals, Inc., "ADMER" (registered trademark) QE800) of 10 mass % is used to prepare the sheet.
Sizing agent (1): Water-soluble polyamide (made by Toray Industries, Inc., "T-70") is used.
Sizing agent (2): Water-soluble polyamide (made by Toray Industries, Inc., "A-90") is used.
Sizing agent (3): Water-soluble polyamide (made by Toray Industries, Inc., "P-70") is used.
Sizing agent (4): Water-soluble polyamide (made by Toray Industries, Inc., "P-95") is used.

Production Method of Reinforcing Fiber Mat

The fiber bundle rolled out by a winder constantly at 10 m/min is fed to a vibrational widening roller vibrating in the axial direction at 10 Hz to widen the width, and then is fed to a width regulation roller to make a widened fiber bundle.
Then, the widened fiber bundle is continuously immersed in a sizing agent diluted with purified water. Next, the sizing agent-applied widened fiber bundle is dried to remove moisture with a hot roller at 250° C. and a drying furnace (atmospheric condition) at 250° C. to perform heat treatment for 1.5 min.
Thus obtained widened fiber bundle is fed to a fiber separation means provided with iron plates for fiber separation having a protrusive shape of 0.2 mm thickness, 3 mm width and 20 mm height, the iron plates being set in parallel at regular intervals along the reinforcing fiber bundle width.

The fiber separation means is intermittently inserted in and extracted from the widened fiber bundle to make a separated reinforcing fiber bundle.
The fiber separation means is kept for 3 sec as inserted in the widened fiber bundle travelling constantly at 10 m/min to generate a separated fiber section, and then is kept for 0.2 sec as extracted therefrom. Such an insertion/extraction process is repeated.
The obtained reinforcing fiber bundle has separated fiber sections in which fiber bundles are separated with respect to the width direction to have a target average fiber number. At least one end of a separated fiber section has an accumulated interlacing section in which interlaced single yarns are accumulated. Next, the obtained reinforcing fiber bundles are continuously inserted into a rotary cutter to cut the fiber bundles into a fiber length, and then are sprayed to be dispersed uniformly to make a reinforcing fiber mat having an isotropic fiber orientation.
The reinforcing fiber mat sandwiched vertically by resin sheets with a double-belt pressing machine having a gap is impregnated with the resin to produce a forming material.
The productivity of fiber-reinforced resin forming material is evaluated as: level C for a condition in which the base material is not impregnated with resin in the surface layer or in which fibers are twisted in the surface layer; and level A for a condition in which the base material is impregnated with resin in the surface layer without twisted fibers.

Reference Example 1

As shown in Table 1, a reinforcing fiber mat is produced from reinforcing fiber bundle (1) to have properties such as 990 of average fiber number in bundle, 1,540/mm of fiber number per unit width, 3.2 wt % of total sizing agent adhesion amount including sizing agent (1), and 99.5 wt % of weight content of bundles having 86 or more of the fiber number in the bundle.

Reference Example 2

As shown in Table 1, a reinforcing fiber mat is produced from reinforcing fiber bundle (1) to have properties such as 1,030 of average fiber number in bundle, 1,480/mm of fiber number per unit width, 4.0 wt % of total sizing agent adhesion amount including sizing agent (1), and 99.7 wt % of weight content of bundles having 86 or more of the fiber number in the bundle.

Reference Example 3

As shown in Table 1, a reinforcing fiber mat is produced from reinforcing fiber bundle (1) to have properties such as 1,880 of average fiber number in bundle, 1,220/mm of fiber number per unit width, 3.1 wt % of total sizing agent adhesion amount including sizing agent (1), and 99.8 wt % of weight content of bundles having 86 or more of the fiber number in the bundle.

Reference Example 4

As shown in Table 1, a reinforcing fiber mat is produced from reinforcing fiber bundle (1) to have properties such as 5,230 of average fiber number in bundle, 1,540/mm of fiber number per unit width, 2.8 wt % of total sizing agent adhesion amount including sizing agent (2), and 99.6 wt % of weight content of bundles having 86 or more of the fiber number in the bundle.

Reference Example 5

As shown in Table 1, a reinforcing fiber mat is produced from reinforcing fiber bundle (2) to have properties such as 410 of average fiber number in bundle, 550/mm of fiber number per unit width, 3.3 wt % of total sizing agent adhesion amount including sizing agent (2), and 99.7 wt % of weight content of bundles having 86 or more of the fiber number in the bundle.

Reference Example 6

As shown in Table 1, a reinforcing fiber mat is produced from reinforcing fiber bundle (1) to have properties such as 1,540 of average fiber number in bundle, 2,580/mm of fiber number per unit width, 3.3 wt % of total sizing agent adhesion amount including sizing agent (3), and 99.3 wt % of weight content of bundles having 86 or more of the fiber number in the bundle.

Reference Example 7

As shown in Table 1, a reinforcing fiber mat is produced from reinforcing fiber bundle (1) to have properties such as 1,120 of average fiber number in bundle, 3,940/mm of fiber number per unit width, 4.7 wt % of total sizing agent adhesion amount including sizing agent (4), and 99.2 wt % of weight content of bundles having 86 or more of the fiber number in the bundle.

Reference Example 8

As shown in Table 1, a reinforcing fiber mat is produced from reinforcing fiber bundle (1) to have properties such as 930 of average fiber number in bundle, 4,380/mm of fiber number per unit width, 3.1 wt % of total sizing agent adhesion amount including sizing agent (4), and 99.4 wt % of weight content of bundles having 86 or more of the fiber number in the bundle.

Reference Example 9

As shown in Table 1, a reinforcing fiber mat is produced from reinforcing fiber bundle (1) to have properties such as 1,070 of average fiber number in bundle, 1,510/mm of fiber number per unit width, 2.4 wt % of total sizing agent adhesion amount including sizing agent (4), and 99.7 wt % of weight content of bundles having 86 or more of the fiber number in the bundle.

Reference Example 10

As shown in Table 1, a reinforcing fiber mat is produced from reinforcing fiber bundle (1) to have properties such as 1,030 of average fiber number in bundle, 1,490/mm of fiber number per unit width, 1.7 wt % of total sizing agent adhesion amount including sizing agent (4), and 99.8 wt % of weight content of bundles having 86 or more of the fiber number in the bundle.

Reference Example 11

As shown in Table 1, a reinforcing fiber mat is produced from reinforcing fiber bundle (2) to have properties such as 300 of average fiber number in bundle, 400/mm of fiber number per unit width, 3.0 wt % of total sizing agent adhesion amount including sizing agent (2), and 99.6 wt % of weight content of bundles having 86 or more of the fiber number in the bundle.

Reference Example 12

As shown in Table 1, a reinforcing fiber mat is produced from reinforcing fiber bundle (1) to have properties such as 1,010 of average fiber number in bundle, 1,510/mm of fiber number per unit width, 4.0 wt % of total sizing agent adhesion amount including sizing agent (1), and 95.0 wt % of weight content of bundles having 86 or more of the fiber number in the bundle.

Reference Example 13

As shown in Table 1, a reinforcing fiber mat is produced from reinforcing fiber bundle (1) to have properties such as 930 of average fiber number in bundle, 1,480/mm of fiber number per unit width, 5.5 wt % of total sizing agent adhesion amount including sizing agent (3), and 99.2 wt % of weight content of bundles having 86 or more of the fiber number in the bundle.

Example 1

The reinforcing fiber mat and resin sheet (1) prepared in Reference Example 1 were held with 1 MPa of surface pressure for 5 min in a thickness-regulated die at 280° C. It was cooled down below 100° C. at −20° C./min as applying the surface pressure to produce fiber-reinforced resin forming material. The forming material had a thickness corresponding to the gap between plates thicker by 8.7% than the fully resin-impregnated thickness. Table 2 shows the evaluation results of mechanical properties and fluidity of forming material.

Example 2

The reinforcing fiber mat and resin sheet (2) prepared in Reference Example 2 were held with 1 MPa of surface pressure for 5 min in a thickness-regulated die at 220° C. It was cooled down below 100° C. at −20° C./min as applying the surface pressure to produce fiber-reinforced resin forming material. The forming material had a thickness corresponding to the gap between plates thicker by 13.6% than the fully resin-impregnated thickness. Table 2 shows the evaluation results of mechanical properties and fluidity of forming material.

Example 3

The reinforcing fiber mat and resin sheet (1) prepared in Reference Example 3 were held with 1 MPa of surface pressure for 5 min in a thickness-regulated die at 280° C. It was cooled down below 100° C. at −20° C./min as applying the surface pressure to produce fiber-reinforced resin forming material. The forming material had a thickness corresponding to the gap between plates thicker by 28.2% than the fully resin-impregnated thickness. Table 2 shows the evaluation results of mechanical properties and fluidity of forming material.

Example 4

The reinforcing fiber mat and resin sheet (1) prepared in Reference Example 4 were held with 1 MPa of surface pressure for 5 min in a thickness-regulated die at 280° C. It was cooled down below 100° C. at −20° C./min as applying the surface pressure to produce fiber-reinforced resin forming material. The forming material had a thickness corresponding to the gap between plates thicker by 22.0% than the fully resin-impregnated thickness. Table 2 shows the evaluation results of mechanical properties and fluidity of forming material.

Example 5

The reinforcing fiber mat and resin sheet (1) prepared in Reference Example 5 were held with 1 MPa of surface pressure for 5 min in a thickness-regulated die at 280° C. It was cooled down below 100° C. at −20° C./min as applying the surface pressure to produce fiber-reinforced resin forming material. The forming material had a thickness corresponding to the gap between plates thicker by 16.3% than the fully resin-impregnated thickness. Table 2 shows the evaluation results of mechanical properties and fluidity of forming material.

Comparative Example 1

The reinforcing fiber mat and resin sheet (1) prepared in Reference Example 6 were held with 1 MPa of surface pressure for 5 min in a thickness-regulated die at 280° C. It was cooled down below 100° C. at −20° C./min as applying the surface pressure to produce fiber-reinforced resin forming material. The forming material had a thickness corresponding to the gap between plates thicker by 4.2% than the fully resin-impregnated thickness. Table 2 shows the evaluation results of mechanical properties and fluidity of forming material.

Comparative Example 2

The reinforcing fiber mat and resin sheet (1) prepared in Reference Example 7 were held with 1 MPa of surface pressure for 5 min in a thickness-regulated die at 280° C. It was cooled down below 100° C. at −20° C./min as applying the surface pressure to produce fiber-reinforced resin forming material. The forming material had a thickness corresponding to the gap between plates thicker by 66.7% than the fully resin-impregnated thickness. Table 2 shows the evaluation results of mechanical properties and fluidity of forming material.

Comparative Example 3

The reinforcing fiber mat and resin sheet (2) prepared in Reference Example 8 were held with 1 MPa of surface pressure for 5 min in a thickness-regulated die at 280° C. It was cooled down below 100° C. at −20° C./min as applying the surface pressure to produce fiber-reinforced resin forming material. The forming material had a thickness corresponding to the gap between plates thicker by 16.3% than the fully resin-impregnated thickness. Table 2 shows the evaluation results of mechanical properties and fluidity of forming material.

Comparative Example 4

The reinforcing fiber mat and resin sheet (2) prepared in Reference Example 9 were held with 1 MPa of surface pressure for 5 min in a thickness-regulated die at 280° C. It was cooled down below 100° C. at −20° C./min as applying the surface pressure to produce fiber-reinforced resin forming material. The forming material had a thickness corresponding to the gap between plates thicker by 26.3% than the fully resin-impregnated thickness. Table 2 shows the evaluation results of mechanical properties and fluidity of forming material.

Comparative Example 5

The reinforcing fiber mat and resin sheet (2) prepared in Reference Example 10 were held with 1 MPa of surface pressure for 5 min in a thickness-regulated die at 280° C. It was cooled down below 100° C. at −20° C./min as applying the surface pressure to produce fiber-reinforced resin forming material. The forming material had a thickness corresponding to the gap between plates thicker by 31.3% than the fully resin-impregnated thickness. Table 2 shows the evaluation results of mechanical properties and fluidity of forming material.

Comparative Example 6

The reinforcing fiber mat and resin sheet (1) prepared in Reference Example 11 were held with 1 MPa of surface pressure for 5 min in a thickness-regulated die at 280° C. It was cooled down below 100° C. at −20° C./min as applying the surface pressure to produce fiber-reinforced resin forming material. The forming material had a thickness corresponding to the gap between plates thicker by 17.6% than the fully resin-impregnated thickness. Table 2 shows the evaluation results of mechanical properties and fluidity of forming material.

Comparative Example 7

The reinforcing fiber mat and resin sheet (2) prepared in Reference Example 12 were held with 1 MPa of surface pressure for 5 min in a thickness-regulated die at 220° C. It was cooled down below 100° C. at −20° C./min as applying the surface pressure to produce fiber-reinforced resin forming material. The forming material had a thickness corresponding to the gap between plates thicker by 13.6% than the fully resin-impregnated thickness. Table 2 shows the evaluation results of mechanical properties and fluidity of forming material.

Comparative Example 8

The reinforcing fiber mat and resin sheet (2) prepared in Reference Example 13 were held with 1 MPa of surface pressure for 5 min in a thickness-regulated die at 280° C. It was cooled down below 100° C. at −20° C./min as applying the surface pressure to produce fiber-reinforced resin forming material. The forming material had a thickness corresponding to the gap between plates thicker by 16.3% than the fully resin-impregnated thickness. Table 2 shows the evaluation results of mechanical properties and fluidity of forming material.

TABLE 1

| | Continuous fiber bundle | Fiber number in bundle | Weight content (%) of bundle having 86 or more fibers in bundle | Average fiber number in bundle | Additional sizing agent | Drape level (mm) | Bundle hardness (g) | Average fiber length (mm) |
|---|---|---|---|---|---|---|---|---|
| Reference Example 1 | Reinforcing fiber bundle 1 (carbon fiber bundle) | 50,000 | 99.5 | 990 | Sizing agent 1 (water-soluble polyamide T-70) | 138 | 81 | 30 |
| Reference Example 2 | Reinforcing fiber bundle 1 (carbon fiber bundle) | 50,000 | 99.7 | 1,030 | Sizing agent 1 (water-soluble polyamide T-70) | 142 | 89 | 12 |
| Reference Example 3 | Reinforcing fiber bundle 1 (carbon fiber bundle) | 50,000 | 99.8 | 1,880 | Sizing agent 1 (water-soluble polyamide T-70) | 233 | 195 | 20 |
| Reference Example 4 | Reinforcing fiber bundle 1 (carbon fiber bundle) | 50,000 | 99.6 | 5,230 | Sizing agent 2 (water-soluble polyamide A-90) | 133 | 78 | 20 |
| Reference Example 5 | Reinforcing fiber bundle 2 (fiber-glass bundle) | 1,600 | 99.7 | 410 | Sizing agent 2 (water-soluble polyamide A-90) | 127 | 76 | 20 |
| Reference Example 6 | Reinforcing fiber bundle 1 (carbon fiber bundle) | 50,000 | 99.3 | 1,540 | Sizing agent 3 (water-soluble polyamide P-70) | 204 | 163 | 20 |
| Reference Example 7 | Reinforcing fiber bundle 1 (carbon fiber bundle) | 50,000 | 99.2 | 1,120 | Sizing agent 4 (water-soluble polyamide P-95) | 243 | 220 | 20 |
| Reference Example 8 | Reinforcing fiber bundle 1 (carbon fiber bundle) | 50,000 | 99.4 | 930 | Sizing agent 4 (water-soluble polyamide P-95) | 145 | 84 | 20 |
| Reference Example 9 | Reinforcing fiber bundle 1 (carbon fiber bundle) | 50,000 | 99.7 | 1,070 | Sizing agent 4 (water-soluble polyamide P-95) | 105 | 61 | 20 |
| Reference Example 10 | Reinforcing fiber bundle 1 (carbon fiber bundle) | 50,000 | 99.8 | 1,030 | Sizing agent 4 (water-soluble polyamide P-95) | 52 | 35 | 20 |
| Reference Example 11 | Reinforcing fiber bundle 2 (fiber-glass bundle) | 1,600 | 99.6 | 300 | Sizing agent 2 (water-soluble polyamide A-90) | 127 | 73 | 20 |
| Reference Example 12 | Reinforcing fiber bundle 1 (carbon fiber bundle) | 50,000 | 95.0 | 1,010 | Sizing agent 1 (water-soluble polyamide T-70) | 151 | 92 | 12 |
| Reference Example 13 | Reinforcing fiber bundle 1 (carbon fiber bundle) | 50,000 | 99.2 | 930 | Sizing agent 3 (water-soluble polyamide P-70) | 180 | 123 | 4 |

TABLE 1-continued

| | Continuous fiber bundle | Single yarn number per unit width (fibers/mm) | Thickness (mm) | Bundle width (mm) | Sizing agent adhesion (mass %) | Width change rate W2/W1 |
|---|---|---|---|---|---|---|
| Reference Example 1 | Reinforcing fiber bundle 1 (carbon fiber bundle) | 1,540 | 0.07 | 0.6 | 3.2 | 0.9 |
| Reference Example 2 | Reinforcing fiber bundle 1 (carbon fiber bundle) | 1,480 | 0.07 | 0.7 | 4.0 | 0.8 |
| Reference Example 3 | Reinforcing fiber bundle 1 (carbon fiber bundle) | 1,220 | 0.23 | 0.4 | 3.1 | 0.9 |
| Reference Example 4 | Reinforcing fiber bundle 1 (carbon fiber bundle) | 1,540 | 0.07 | 3.4 | 2.8 | 0.9 |
| Reference Example 5 | Reinforcing fiber bundle 2 (fiber-glass bundle) | 550 | 0.07 | 0.7 | 3.3 | 0.8 |
| Reference Example 6 | Reinforcing fiber bundle 1 (carbon fiber bundle) | 2,580 | 0.12 | 0.6 | 3.3 | 0.8 |
| Reference Example 7 | Reinforcing fiber bundle 1 (carbon fiber bundle) | 3,940 | 0.18 | 0.3 | 4.7 | 0.9 |
| Reference Example 8 | Reinforcing fiber bundle 1 (carbon fiber bundle) | 4,380 | 0.07 | 0.6 | 3.1 | 0.9 |
| Reference Example 9 | Reinforcing fiber bundle 1 (carbon fiber bundle) | 1,510 | 0.07 | 0.6 | 2.4 | 0.8 |
| Reference Example 10 | Reinforcing fiber bundle 1 (carbon fiber bundle) | 1,490 | 0.07 | 0.6 | 1.7 | 0.7 |
| Reference Example 11 | Reinforcing fiber bundle 2 (fiber-glass bundle) | 400 | 0.07 | 1.0 | 3.0 | 0.8 |
| Reference Example 12 | Reinforcing fiber bundle 1 (carbon fiber bundle) | 1,510 | 0.07 | 0.7 | 4.0 | 0.8 |
| Reference Example 13 | Reinforcing fiber bundle 1 (carbon fiber bundle) | 1,480 | 0.07 | 0.6 | 5.5 | 0.9 |

TABLE 2

| | Continuous fiber bundle | Matrix resin | Void ratio (vol %) | (Sheet thickness)/ (Fully-impregnated resin thickness) × 100 − 100 (%) | Forming material | | | |
|---|---|---|---|---|---|---|---|---|
| | | | | | Process passability | Productivity | Average bending strength | Fluidity |
| Example 1 | Reference Example 1 | Reinforcing fiber bundle 1 (carbon fiber bundle) | Resin sheet 1 | 8 | 8.7 | A | A | A | B |
| Example 2 | Reference Example 2 | Reinforcing fiber bundle 1 (carbon fiber bundle) | Resin sheet 2 | 12 | 13.6 | A | A | A | A |
| Example 3 | Reference Example 3 | Reinforcing fiber bundle 1 (carbon fiber bundle) | Resin sheet 1 | 22 | 28.2 | A | A | A | A |
| Example 4 | Reference Example 4 | Reinforcing fiber bundle 1 (carbon fiber bundle) | Resin sheet 1 | 18 | 22.0 | A | A | B | A |
| Example 5 | Reference Example 5 | Reinforcing fiber bundle 2 (fiberglass bundle) | Resin sheet 1 | 14 | 16.3 | A | A | B | B |
| Comparative Example 1 | Reference Example 6 | Reinforcing fiber bundle 1 (carbon fiber bundle) | Resin sheet 1 | 4 | 4.2 | A | C | B | A |
| Comparative Example 2 | Reference Example 7 | Reinforcing fiber bundle 1 (carbon fiber bundle) | Resin sheet 1 | 40 | 66.7 | C | C | B | B |
| Comparative Example 3 | Reference Example 8 | Reinforcing fiber bundle 1 (carbon fiber bundle) | Resin sheet 2 | 14 | 16.3 | A | A | C | B |
| Comparative Example 4 | Reference Example 9 | Reinforcing fiber bundle 1 (carbon fiber bundle) | Resin sheet 2 | 24 | 26.3 | C | A | B | B |
| Comparative Example 5 | Reference Example 10 | Reinforcing fiber bundle 1 (carbon fiber bundle) | Resin sheet 2 | 26 | 31.3 | C | A | B | B |
| Comparative Example 6 | Reference Example 11 | Reinforcing fiber bundle 2 (fiberglass bundle) | Resin sheet 1 | 15 | 17.6 | A | A | B | C |
| Comparative Example 7 | Reference Example 12 | Reinforcing fiber bundle 1 (carbon fiber bundle) | Resin sheet 2 | 12 | 13.6 | A | A | A | C |
| Comparative Example 8 | Reference Example 13 | Reinforcing fiber bundle 1 (carbon fiber bundle) | Resin sheet 2 | 14 | 16.3 | A | A | C | A |

INDUSTRIAL APPLICATION

Our reinforcing fiber mat is applicable to materials of discontinuous reinforcing fiber composite for automotive interior/exterior, electric/electronic equipment housing, bicycle, airplane interior, box for transportation or the like.

The invention claimed is:

1. A reinforcing fiber mat comprising reinforcing fiber bundles having an average fiber length of 5 mm to 100 mm,
wherein reinforcing fiber bundles consisting of 86 or more fibers per bundle are contained at a weight content of more than 99 wt % to 100 wt %, and
the reinforcing fiber bundles contain single yarns by 500 fibers/mm-width or more and 1,600 fibers/mm-width or less and have a drape level of 120 mm or more and 240 mm or less.

2. The reinforcing fiber mat according to claim 1, wherein the reinforcing fiber bundles are coated with an epoxy resin.

3. The reinforcing fiber mat according to claim 1, wherein the reinforcing fiber bundles are coated with a polyamide resin.

4. The reinforcing fiber mat according to claim 1, wherein the reinforcing fiber bundles have a bundle hardness of 39 g or more and 200 g or less.

5. The reinforcing fiber mat according to claim 1, wherein the reinforcing fiber bundles have an average thickness of 0.01 mm or more and 0.2 mm or less.

6. The reinforcing fiber mat according to claim 1, wherein the reinforcing fiber bundles have an average width of 0.03 mm or more and 3 mm or less.

7. The reinforcing fiber mat according to claim 1, wherein the reinforcing fiber bundles have a width change rate W2/W1 of 0.5 or more and 1.1 or less.

8. The reinforcing fiber mat according to claim 1, wherein the reinforcing fiber bundles have a sizing agent adhesion amount of 0.1 wt % or more and 5 wt % or less.

9. The reinforcing fiber mat according to claim 1, wherein the reinforcing fiber bundles have an average fiber number of 86 or more and 4,000 or less.

10. The reinforcing fiber mat according to claim 1, wherein the reinforcing fiber bundles have a cutting angle $\theta$ of 3° or more and 30° or less.

11. A fiber-reinforced resin forming material comprising a thermoplastic resin and the reinforcing fiber mat according to claim 1.

12. A fiber-reinforced resin forming material comprising a thermoplastic resin and reinforcing fiber bundles and having a void ratio of 5 vol % or more and 30 vol % or less, wherein the reinforcing fiber bundles contain single yarns by 500 fibers/mm-width or more and 1,600 fibers/mm-width or less and have a drape level of 120 mm or more and 240 mm or less.

13. A method of producing a fiber-reinforced thermoplastic resin forming material, comprising:

preparing a mat base material of reinforcing fiber bundles that contain single yarns by 500 fibers/mm-width or more and 1,600 fibers/mm-width or less and have a drape level of 120 mm or more and 240 mm or less;

dispersing or layering thermoplastic resin on the mat base material;

melting the thermoplastic resin; and cooling and solidifying the melted thermoplastic resin between plates through a gap thicker by 5% or more than a thickness of a fully resin-impregnated base material.

14. A reinforcing fiber mat comprising reinforcing fiber bundles having an average fiber length of 5 mm to 100 mm, wherein reinforcing fiber bundles consisting of 86 or more fibers per bundle are contained at a weight content of more than 99 wt % to 100 wt %, and the reinforcing fiber bundles have a cutting angle $\theta$ of 3° or more and 30° or less.

* * * * *